June 6, 1967 H. G. HOOPER 3,324,477

DUAL ACTIVATING MEANS FOR TIME RECORDERS

Filed Oct. 20, 1965

INVENTOR

Harrison G. Hooper

BY Newton, Hopkins, Jones & Ormsby

ATTORNEYS

United States Patent Office 3,324,477

Patented June 6, 1967

3,324,477

DUAL ACTIVATING MEANS FOR TIME RECORDERS

Harrison G. Hooper, Atlanta, Ga., assignor to Lathem Time Recorder Co., Inc., Atlanta, Ga., a corporation of Georgia Filed Oct. 20, 1965, Ser. No. 498,655

6 Claims. (Cl. 346—82)

ABSTRACT OF THE DISCLOSURE

What is disclosed is a time recorder for printing information on material inserted into a slot which has an imprinting mechanism that is responsive to material inserted into the slot and that is also responsive to manipulation of an externally positioned bar. The response of the imprinting mechanism to material inserted into the slot is provided by a switch operated with a trigger. Both the switch and the trigger are carried by a support base which is adjustably positioned within the housing to adjust the trigger position and the extent to which material must be inserted into the slot for response of the imprinting means. The externally positioned bar is adjacent an edge of the slot for ease of manipulation and is operatively connected to the same switch as the trigger by a flexible cable so that it remains operative regardless of the position of the support base within the housing.

This invention relates generally to time recorders, and more particularly to a time recorder wherein the imprinting mechanism in the recorder may be activated either internally, by material inserted in said recorder and onto which certain information is to be recorded, or externally, by manual manipulation.

Time recorders have, for many years, had external means, manually engageable, for activating the imprinting mechanism in the time recorder to record certain information such as time on material inserted in the time recorder. Other time recorders have had internal means to activate the imprinting mechanism in the time recorder to record certain information on the material inserted in the time recorder. These internal means have been activated by the material as it is inserted into the recorder.

Previous time recorders having external, manually engageable, means for activating the imprinting mechanisms have been inadequate since it is extremely easy to misalign the material being stamped within the recorder during the printing operation, and since an appreciable amount of time is wasted in aligning the material in the recorder. On the other hand, previous time recorders having internal means for activating the imprinting mechanism in response to movement of material inserted in the slot of the recorder have been inadequate since, when thin material was desired to be printed, the material did not exert enough pressure against the internal means for activating the imprinting mechanism to cause the material to be printed.

The invention described herein overcomes these and other problems and disadvantages associated with prior art devices in that an internal and external means for activating the imprinting mechanism of the recorder is provided. The external manual means for activating the imprinting mechanism of the recorder is operable concurrently with the internal activating means. Also, the internal activating means may be moved with respect to the front of the time recorder and the imprinting mechanism in order that the material inserted in the recorder be selectively stamped at different locations. When manually manipulated, the external activating means, through a flexible connection between the external activating means and the internal adjustable activating means, operates the internal activating means to activate the imprinting mechanism.

The apparatus of the present invention comprises generally a manual external activating means and an internal activating means carried in a conventional time recorder and having a flexible connection therebetween. The internal activating means is a modified conventional activator usually found in conventional time recorders. This arrangement, then, allows the imprinting mechanism of the time recorder to be activated by the internal activating means and the external activating means concurrently.

These and other features and advantages of the invention will be more clearly understood upon consideration of the following specification and the accompanying drawings, wherein like characters of reference designate corresponding parts throughout and in which.

These figures and the following detailed description disclose a specific embodiment of the invention, however, it is to be understood that the inventive concept is not limited thereto since the invention may be embodied in other equivalent forms.

Figure 1:
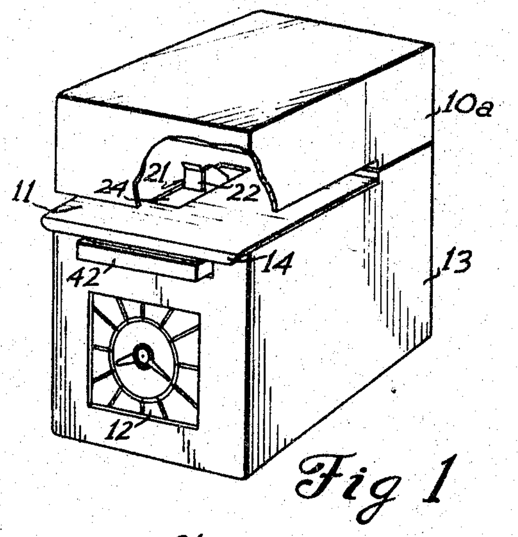
FIG. 1 is a perspective view of a time recorder embodying the present invention.

Referring to FIG. 1, it will be seen that the invention includes a time recorder 10 having a housing 13 with a conventional insertion slot 11 therein and a conventional clock 12 associated therewith. A flat support platform 14 is provided in the lower side of the slot 11 upon which material to be stamped rests when inserted in the slot 11.

The time recorder 10 is provided with an internal activating mechanism 15 and an external activating mechanism 16, either of which is capable of activating an imprinting mechanism (not shown) of the time recorder 10. The internal activating mechanism 15 is operated by material (not shown) such as paper or the like when it is inserted into the slot 11 to have information printed thereon and the external activating mechanism is manually operated.

Figure 2:
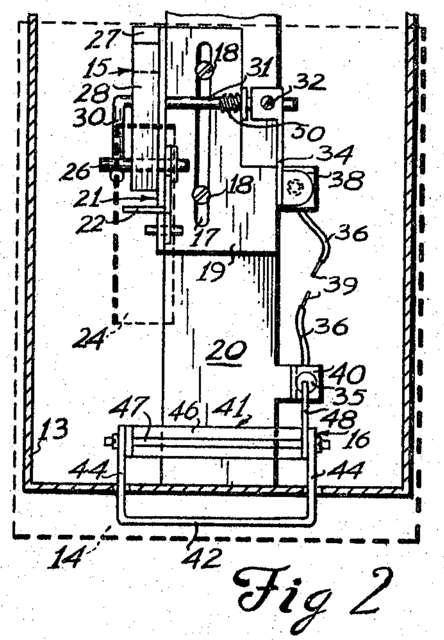
FIG. 2 is a top plan view of the internal and external activating mechanisms.
Figure 3:
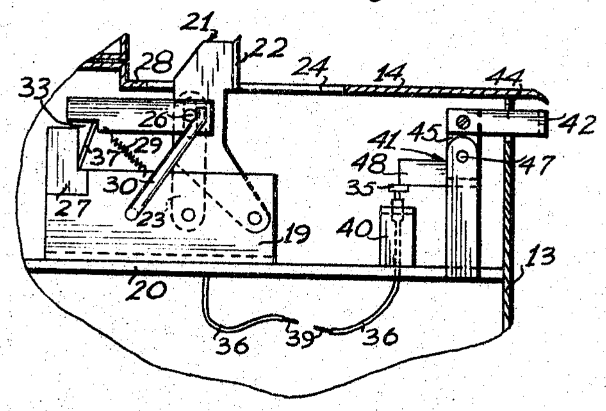
FIG. 3 is an elevational view of the recorder of FIG. 1, partially broken away to show the location of the push arm connection with the contact block.
Figure 4:
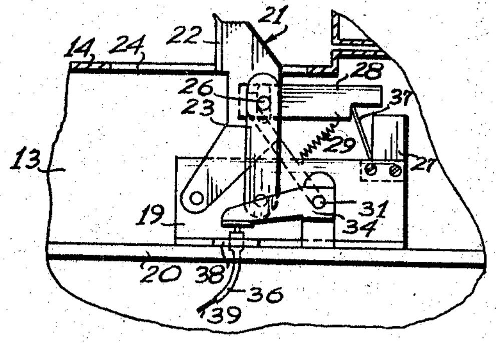
FIG. 4 is an elevational view of the recorder opposite that shown in FIG. 3, partially broken away to show the connection of the activator arm to the internal triggering mechanism and the internal activating trigger; and, FIG. 5 is an enlarged partial elevational view showing the connection of the trigger and positioning link to the contact block.

Referring more specifically to FIGS. 2, 3, and 4, it will be seen that the internal activating mechanism 15 includes a support base 19 fixedly yet slidably carried on a member 20 fixedly attached to the inside of the housing 13. The support base 19 may be moved with respect to the member 20 by loosening a pair of screws 18 which threadably engage the member 20 and are slidably received through an elongate slot 17 in the support base 19. Upon retightening the screws 18, the base 19 is again fixed with respect to the member 20.

The base 19 pivotably carries thereon a trigger 21 which has a bumper portion 22 for contacting material (not shown) inserted in the slot 11. The trigger 21 is pivoted at its lower end as seen in FIGS. 3 and 4 and the bumper portion 22 thereof extends above the platform 14 so that contact between the bumper 22 and the material (not shown) is insured when inserted in the slot 11.

An adjustment slot 24 in the platform 14 slidably receives the trigger 21 therethrough. The slot 24 is effective to permit the trigger 21 to pivot with respect to the support base 19 and to move with support base 19 as it slides on the member 20 to vary the position of the internal activating means with respect to the front of the housing 13 and the imprinting mechanism (not shown). This serves to vary the position on the material at which the imprinting mechanism prints.

Figure 5:
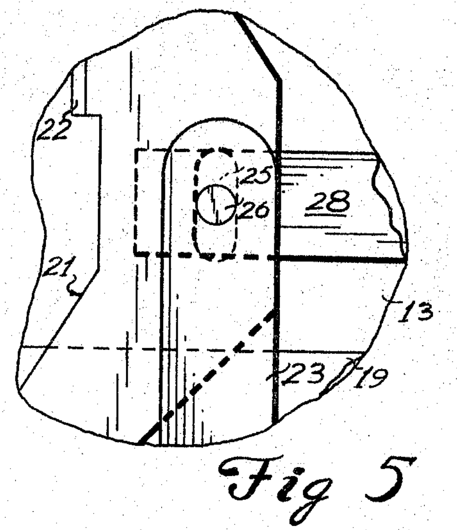

A push slot 25 is defined in the trigger 21 and slidably receives one end of a push rod 26 therethrough. The push rod 26 is fixedly carried at one end of a positioning link 23. The positioning link 23 is pivotably carried by the support base 19 at its other end so that as the trigger 21 pivots, the push rod 26 connection with the positioning link 23 also forces the link 23 to pivot. Since the pivot axis of the trigger 21 is displaced from the pivot axis of the positioning link 23, the rod 26 moves with respect to the trigger 21 as the trigger 21 and link 23 pivot. Such movement is allowed by the slot 25 in the trigger 21. This movement, however, is restricted by the length of the slot 25 as best seen in FIG. 5.

A contact block 28 is pivotably carried by the push rod 26 as best seen in FIG. 3. This means that, as the trigger 21 is pivoted, the block 28 will be pushed by the rod 26. In order that the block 28 is always biased in a particularly rotational direction, a spring 29 connects the support base 19 and the block 28. The particular direction of biasness is counterclockwise as seen in FIG. 3.

Positioned under the block 28, as seen in FIGS. 3 and 4, is a conventional microswitch 27 which serves to limit the downward movement of the block 28. A notch 33 formed in the bottom of the block 28 on the end opposite that at which it is pivoted serves to catch the actuator 37 of the microswitch 27 and manipulate the switch 27 as the block 28 is moved along the top of the switch by the rod 26. This is effective to actuate the imprinting mechanism (not shown) of the recorder 10.

The push rod 26 extends through the contact block 28 and is contacted at the other end thereof by a push arm 30 of the external activating mechanism 16. The push arm 30 is an integral extension of a support shaft 31 rotatably carried by and extending transversely across the support base 19. The push arm 30 is arranged so that it will contact the push rod 26 as it pivots however, it allows push rod 26 to freely move toward the left as seen in FIG. 3 independently of the arm 30 since the arm 30 merely pushes the rod 26 and is not attached thereto. Therefore, the contact block 28 may be moved by either the trigger 21 or the push arm 30.

In order that the contact block 28 is always urged to the left as shown in FIG. 4, the spring 29 is arranged so that it imparts a component of force on the block 28 effective to urge the block 28 to the left while simultaneously urging the block 28 against the top of the switch 27. The movement of the block 28 toward the left as seen in FIG. 4 is checked by the arm 30 and the trigger 21 as will be described hereinafter.

Fixedly yet adjustably attached to the end of the support shaft 31 opposite that onto which the push arm 30 is formed is a trip crank 34 which has a contact tab 35 integral with its extending end. The crank 34 is maintained in fixed relation to the shaft 31 by a set screw 32 which will easily release the crank 34 for adjustment. Therefore, it will be seen that pivoting the crank 34 causes the arm 30 to pivot and move the block 28.

One end of a flexible cable housing 36 is attached to a positioning tab 38 formed integral with the support base 19 and locates a flexible cable 39 carried by the cable housing 36 so that it contacts the contact tab 35. This is effective to pivot the crank 34 when cable 39 is extended from the housing 36 and causes the block 28 to be pushed to the right as seen in FIG. 4.

The other end of the cable housing 36 is connected in conventional manner to an attaching tab 40 carried by the member 20. The flexible cable 39 is slightly longer than the housing 36 so that it protrudes from each end thereof to actuate the imprinting mechanism (not shown).

A manual lever 41 is carried at the front of the housing 13 so that a U-shaped press bar 42 is externally exposed across the front of the housing 13 to be manually engageable. The press bar 42 is slidably received through the housing 13 and the legs 44 thereof are pivotably pinned to the legs 45 of a U-shaped transfer member 46. The member 46 is pivoted so that as the press bar 42 is pressed, the member 46 is pivoted. A crank leg 48 is integrally formed on one of the legs 45, so that as the member 46 is pivoted, the extending end of the leg 48 is moved along an arcuate path. The leg 48 has a flattened imput portion integral with the extending end thereof effective to overlie the end of the flexible cable 39 at the tab 40 and cause the cable 39 to slide within the housing 36 when the bar 42 is pressed.

A coil spring 50 encircles the support shaft 31 adjacent the support base 19 and has one end attached to the shaft 31 and the other end attached to the base 19. The spring 50 is effective to urge the shaft 31 in a counterclockwise direction as seen in FIG. 4, so that the crank 34 is also pivoted in a counterclockwise direction as seen in FIG. 4. This urging by the spring 50 insures that the arm 30 and the crank 34 will always return to normal position.

*Operation*

In operation it will be seen that the imprinting mechanism (not shown) may be activated either by the internal or external activating means. The material (not shown) to be stamped is inserted in the slot 11, and, provided the material is stiff enough, will cause the internal activating mechanism to actuate the imprinting mechanism. If the material is not stiff enough, the operator merely presses the press bar 42 to stamp the material.

When the internal activating mechanism 15 is in normal position, the block 28 is urged away from switch actuation position by the spring 29. This serves to move the trigger 21 into material contacting position. The movement of the block 28 is limited by the slot 25 in the trigger 21 when the movement of the rod 26 with respect to the trigger 21 is checked by the upper limit of the slot 25.

The spring 50 encircling the support shaft 31 forces the arm 30 to the right or clockwise, as seen in FIG. 3 when the external activating mechanism 16 is in normal position. The trip crank 34 is urged in a counterclockwise direction as seen in FIG. 4 in normal position but this movement is checked by the end of the cable housing 36. Since the crank 34 is adjustable with respect to the shaft 31, the normal position of the arm 30 is adjustable. Therefore, the arm 30 may be used to check the movement of the block 28 away from actuating contact position with the switch 27.

The position at which information is printed on the material (not shown) inserted in the recorder 10 may be easily adjusted by raising the top portion 10*a* thereof which exposes the screws 18 so that they may be loosened with a conventional screwdriver. After the screws 18 are loosened, the slot 17 allows the base 19 to be moved so as to vary the position on the material at which the imprinting mechanism (not shown) will print. After the base 19 has been positioned, the screws 18 are retightened to fix the support base 19 and the top portion 10*a* is reclosed. The recorder 10 is now ready to be operated again.

It will be obvious to those skilled in the art that many variations may be made in the embodiment herein chosen for the purpose of illustrating the invention without departing from the scope as defined by the appended claims.

What is claimed as my invention is:

1. In a time recorder having an imprinting mechanism operative to print information on material inserted into a slot in the housing of said recorder, a support base adjustably movable within said housing, a trigger pivotally mounted on said support base for movement with said support base and extending into said slot to be engaged and pivoted by material inserted into said slot, a press bar positioned outwardly of said housing adjacent an edge of said slot and mounted within said housing for pivotal motion, a block movable with said support base and independently and slidably movable in response to pivotal motion of said trigger, flexible means including a flexible cable operatively connecting said press bar and said block for slidably moving said block in response to pivotal motion of said press bar independently of motion with said support base and pivotal motion of said trigger, and switch means responsive to slidable motion of said block in response to pivotal motion of said trigger and pivotal motion of said press bar for actuating said imprinting mechanism.

2. The time recorder of claim 1 in which said block is pivotally mounted at one end on said trigger by a rod.

3. The time recorder of claim 2 in which said block is supported at that end opposite said one end by said switch means.

4. The time recorder of claim 3 in which said switch means is a microswitch having an actuator engaged by said end opposite said one end.

5. The time recorder of claim 2 in which said flexible means includes a pivotally mounted arm having its upper end engaging said rod, and a crank for pivoting said arm in response to sliding motion of said cable.

6. The time recorder of claim 1 including a spring for resiliently urging said block in a direction opposite to its direction of slidable motion in response to pivotal motion of said trigger.

References Cited

UNITED STATES PATENTS

| | | | |
|---|---|---|---|
| 908,975 | 1/1909 | Dey | 346—83 |
| 945,802 | 1/1910 | Pratt et al. | 101—298 |
| 2,207,144 | 7/1940 | Cooper | 101—287 |
| 2,968,521 | 1/1961 | Gross | 346—85 |
| 3,183,513 | 5/1965 | Swank | 346—143 X |

RICHARD B. WILKINSON, *Primary Examiner.*

J. W. HARTARY, *Assistant Examiner.*